United States Patent [19]

Yasunobu et al.

[11] Patent Number: 4,852,007

[45] Date of Patent: Jul. 25, 1989

[54] METHOD AND DEVICE FOR STOPPING VEHICLE AT PREDETERMINED POSITION

[75] Inventors: Seiji Yasunobu, Yokohama; Shoji Miyamoto, Kawasaki; Hirokazu Ihara, Machida, all of Japan

[73] Assignee: Hitachi, Ltd., Tokyo, Japan

[21] Appl. No.: 127,549

[22] Filed: Dec. 2, 1987

Related U.S. Application Data

[63] Continuation of Ser. No. 488,455, Apr. 25, 1983, abandoned.

[30] Foreign Application Priority Data

Apr. 27, 1982 [JP] Japan .................................. 57-70931
May 7, 1982 [JP] Japan .................................. 57-75256

[51] Int. Cl.$^4$ .............................................. B61L 3/08
[52] U.S. Cl. .......................... 364/426.01; 246/182 B; 246/182 C
[58] Field of Search ............... 364/426; 246/182 B, 246/182 C, 184, 182 R, 182 A; 180/244, 282; 303/93, 96, 97, 20, 100, 104, 105, 106, 109

[56] References Cited

U.S. PATENT DOCUMENTS

| | | | |
|---|---|---|---|
| 3,131,975 | 5/1964 | Smith et al. | 303/104 |
| 3,508,795 | 4/1970 | Scharlack et al. | 303/104 |
| 3,825,799 | 7/1974 | Matsumura | 303/109 |
| 4,066,230 | 1/1978 | Nohmi et al. | 364/426 |
| 4,155,426 | 5/1979 | Booker Jr. | 364/426 |
| 4,384,695 | 5/1983 | Nohmi et al. | 246/182 B |
| 4,410,154 | 10/1983 | Matty | 246/182 C |

FOREIGN PATENT DOCUMENTS

0118975 9/1979 Japan .............................. 246/182 B

OTHER PUBLICATIONS

Yasunobu et al., "Application of Preductive Fuzzy Control to Automatic Train Operator Controller", International Conference on Industrial Electronics, Tokyo, Japan, 1984, pp. 657–662.

Tong, "A Control Engineering Review of Fuzzy Systems", Automatica, vol. 13, Pergammon Press, 1977, Great Britain, pp. 559–569.

King et al., "The Application of Fuzzy Control Systems to Industrial Processes", Automatica, vol. 13, Pergammon Press, Great Britain, 1977, pp. 235–242.

Zadeh, "Outline of A New Approach to The Analysis of Complex Systems and Decision Processes", IEEE Transactions on Systems, Man, and Cybernetics, Jan. 1973, pp. 28–44.

Zadeh, "Making Computers Think Like People", Aug. 1984, p. 27.

Riondel, P., Automatic Fixed—Point Braking for Multiple—Unit Trains of the Milan Underground Railway, Brown Boveri Review, vol. 63, No. 12, pp. 758–762, Dec. 1976.

Primary Examiner—John W. Caldwell, Sr.
Assistant Examiner—Alvin Oberley
Attorney, Agent, or Firm—Antonelli, Terry & Wands

[57] ABSTRACT

A method and a device for stopping a vehicle at a predetermined position in which the distance between actual and target positions of the vehicle and the velocity and acceleration of the vehicle are detected so as to perform brake control by selecting brake control notches or settings on the basis of the detected values of the distance, the velocity and the acceleration to thereby stop the vehicle at the predetermined position, wherein fuzzy values for a stop gap accuracy in the case where the present notch or brake control setting is maintained as well as a stop gap accuracy in the case when the notch or brake control setting is changed by a predetermined value are obtained and compared with each other to thereby perform the notch or brake control setting selection.

42 Claims, 5 Drawing Sheets

METHOD AND DEVICE FOR STOPPING VEHICLE AT PREDETERMINED POSITION

This application is a continuation of application Ser. No. 488,455, filed Apr. 25, 1983, now abandoned.

BACKGROUND OF THE INVENTION

The present invention relates to a method and a device for stopping a vehicle at a predetermined position and particularly to a method and a device which makes it possible to stop a vehicle, which is driven by discrete control commands generated for example by notching representing predetermined brake settings, at a predetermined target position with high accuracy and with less changes in notching operation.

FIG. 1 is a block diagram illustrating an example of a conventional device for automatically stopping a train at a predetermined position and FIG. 2 is a graph illustrating a velocity pattern for explaining the operations thereof. In FIG. 1, the device comprises a tachometer generator 1, a velocity calculating circuit 2, a distance integrating circuit 3, a position marker 4, a point signal detector 5, a pattern generator 6, a comparator 7, a brake controller 8 and a brake device 9.

According to this conventional device, the point signal detector 5 disposed on a vehicle detects the position marker 4 provided on the ground at a position P (hereinafter referred to as point-P) a predetermined distance l on this side of a target position O (hereinafter referred to as point-O). In response to a point detection signal from the point signal detector 5, the distance integrating circuit 3 counts pulses from the tachometer generator 1 so as to produce a distance S along which the vehicle has travelled from the point-P to the current position at that time, and the pattern generator 6 selects a value of the distance l to the target position out of a memory provided therein so as to produce a target velocity pattern $V_P$ on the basis of the following equation (1):

$$V_P = \sqrt{7.2 \beta_P (l - S)} \quad (1)$$

where $\beta_P$ represents a predetermined deceleration.

The tachometer generator 1 produces pulses at a frequency proportional to the current vehicle velocity $V_T$ and the velocity calculating circuit 2 calculates a digital value of the current or actual velocity $V_T$ of the vehicle from the pulses. The comparator 7 compares the current or actual velocity $V_T$ with the target velocity pattern $V_P$ produced from the pattern generator 6. On the basis of an output ($V_T - V_P$) of the comparator 7, the brake device 9 is proportionally controlled by the brake controller 8 so that the current or actual velocity $V_T$ follows the target velocity pattern $V_P$ to stop the vehicle in close vicinity to the target point-O.

In this conventional device, however, there may occur an offset of tracing error with respect to the target velocity pattern $V_P$ due to the deviations in brake force of the brake device 9 as well as the deviations in external force due to the grade of railway, thereby deteriorating the stop gap accuracy. Further, if integral control is performed for the brake device 9 in addition to the proportional control in order to prevent the above-mentioned offset of tracing error from occurring, it will necessarily increase the frequency of notch-changings, i.e., change of brake settings, to cause another problem that a ride in the vehicle may become uncomfortable.

SUMMARY OF THE INVENTION

An object of the present invention is to eliminate the problems as mentioned above in the conventional method and device for stopping a vehicle at a predetermined position.

Another object of the present invention is to provide a method and a device in which not only the final stop gap accuracy is limited within tolerance but the number of notch-changes is reduced to the utmost so as to prevent the occurrence of an uncomfortable ride in a vehicle. To attain such objects, according to the present invention, a method and a device for stopping a vehicle at a predetermined position in which the distance between the current and target positions of the vehicle and the velocity and acceleration of the vehicle are detected so as to perform brake control by selecting brake control notches or settings on the basis of the detected values of the distance, the velocity and the acceleration to thereby stop the vehicle at the predetermined position, are featured in that the stop gap accuracy in the case where the current notch is maintained as it is and the stop gap accuracy in the case where the notch is changed by a predetermined amount are obtained as fuzzy values and compared with each other to thereby perform the notch selection.

It is a further object of the present invention to obtain an optimum condition of a given event relating to control of a controllable subject such as stopping of a running vehicle, for example, a moving train, at a desired position and includes the features of (a) obtaining a value of a first parameter relating to the current state of the vehicle or controllable subject such as the count speed or acceleration of the vehicle, (b) estimating various values of a second parameter based on the value of the first parameter, which would be obtained if predetermined control modes are applied to the vehicle, respectively, and (c) determining which one of the predetermined control modes is to be applied to the running vehicle by evaluating the estimated values according to a selected one of a plurality of predetermined rules, for example. Especially, the evaluation is made based on fuzzy values representing the degree of satisfaction of the estimated values of the second parameter in accordance with performance indices.

BRIEF DESCRIPTION OF THE DRAWINGS

The objects, features and advantages of the invention will be clearly understood from the following description of the embodiments of the invention with reference to the accompanying drawings in which.

DESCRIPTION OF THE PREFERRED EMBODIMENTS

Figure 1:
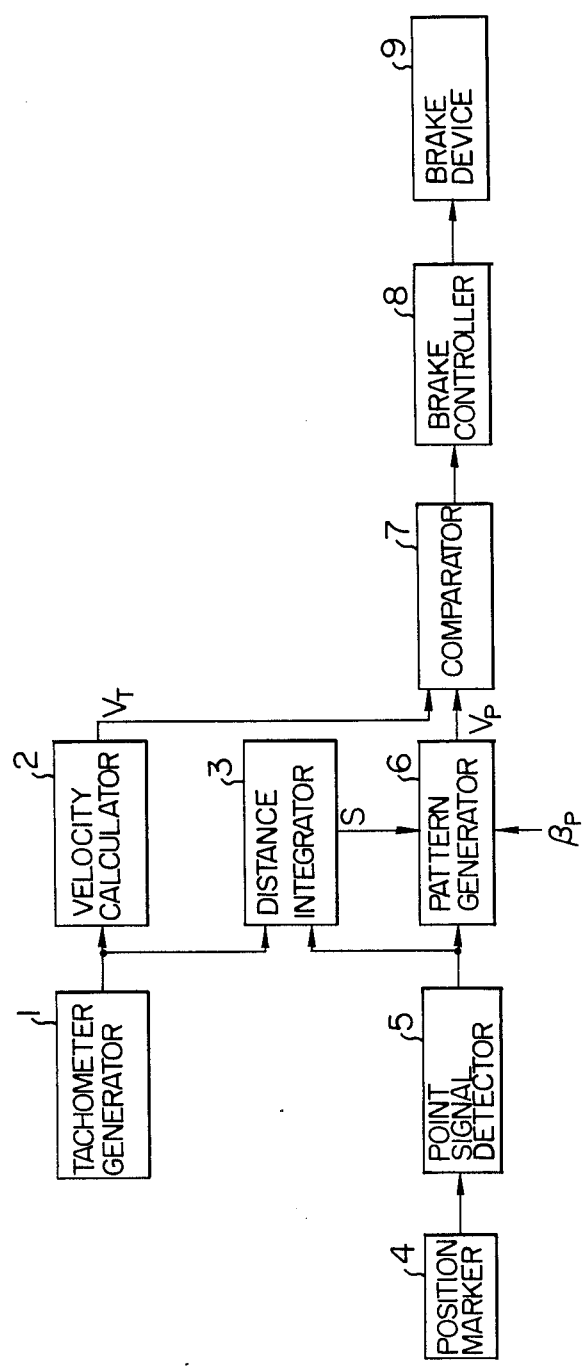
FIG. 1 is a block diagram illustrating an example of a conventional device for stopping a vehicle at a predetermined position.
Figure 2:
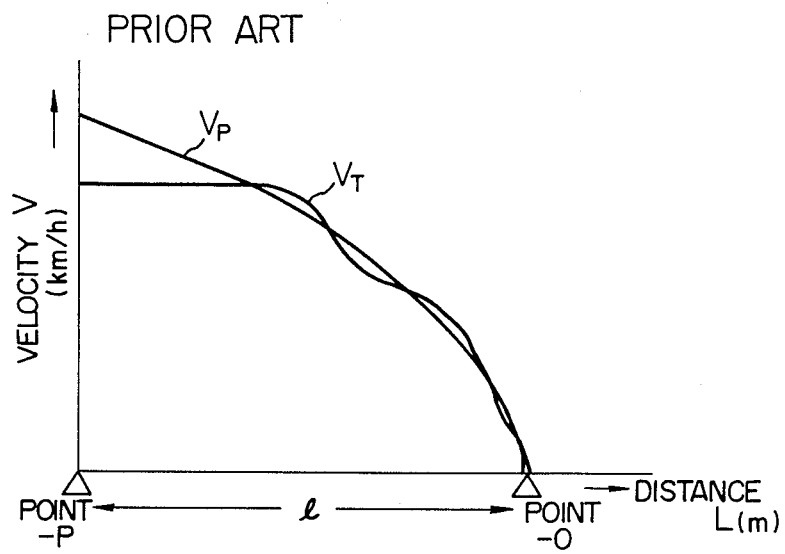
FIG. 2 is a graph of a velocity pattern for explaining the operation of the device of FIG. 1.
Figure 3:
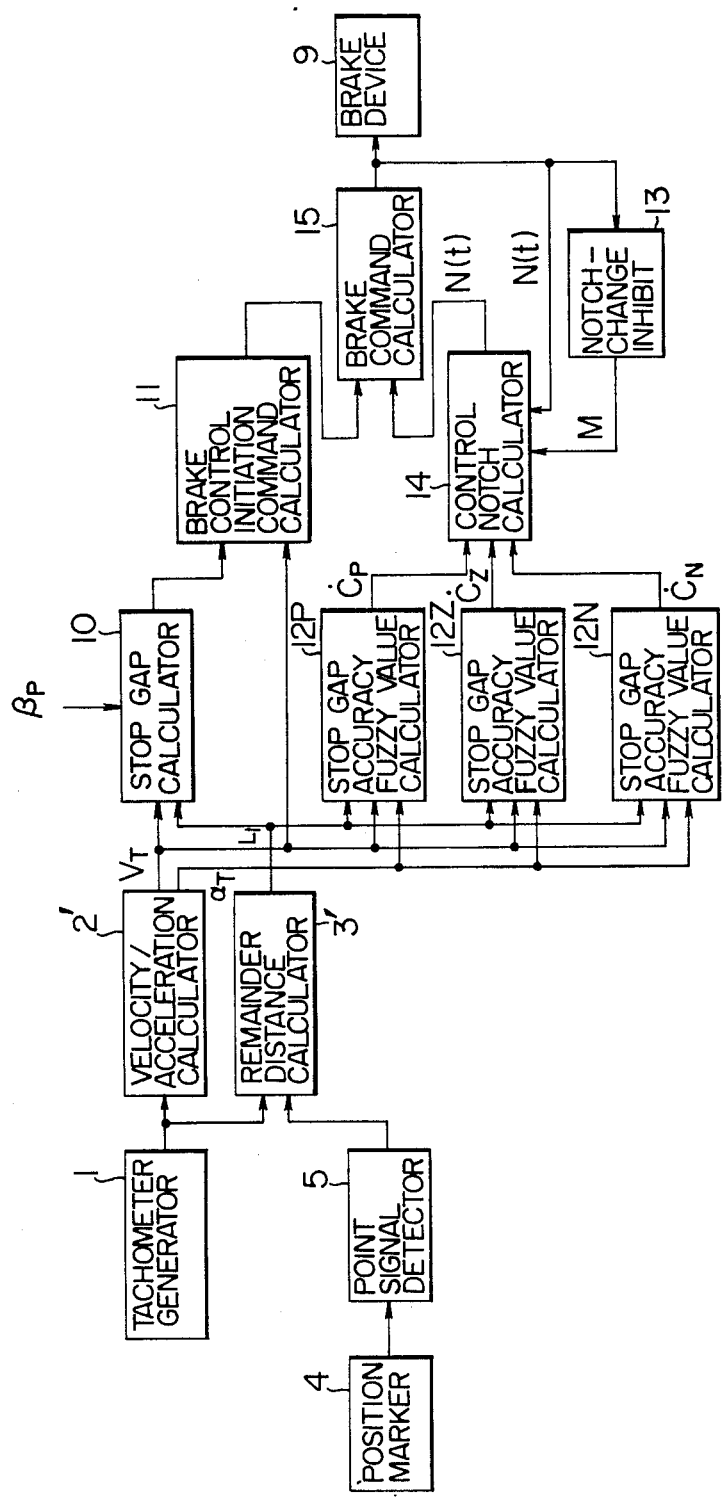
FIG. 3 is a block diagram of an embodiment of the device for stopping a vehicle at a predetermined position according to the present invention.

With reference to FIG. 3, there is shown a block diagram of an embodiment of the device for stopping a vehicle at a predetermined position according to the present invention. In FIG. 3, the same constituent components as those shown in FIG. 1 are represented by the same reference numerals as those used in FIG. 1. In FIG. 3, the reference numeral 2' denotes a velocity/acceleration calculating circuit for calculating an actual or current velocity $V_T$ and an actual or current acceleration $\alpha_T$ of the vehicle on the basis of the pulses produced in the last one second from the tachometer generator 1, 3' denotes a remainder distance calculating circuit for calculating a distance $L_1$ between a current position $x_1$ and a target stop point-O of the vehicle, 10 denotes a notch stop gap calculating circuit for calculating a stop gap $L_2$ in the case where the vehicle is braked with a selected notch at a given point on the basis of the following equation (2) by using the actual or current velocity $V_T$ of the vehicle, the distance $L_1$ to the target point-O and a deceleration $\beta_P$ predetermined corresponding to the selected notch $$L_2 = L_1 - V_T^2/(7.2 \cdot \beta_P) \tag{2}$$

and 11 denotes a brake control initiation command calculating circuit for calculating a time $\Delta T$ to initiation of the braking control in the case where the vehicle runs with the current velocity on the basis of the following equation (3) by using the above-mentioned stop gap error $L_2$ and the current velocity $V_T$ $$\Delta T = 3.6 \cdot L_2 / V_T \tag{3}$$

and producing a signal to command initiation of the brake control for stopping the vehicle at the predetermined position when the calculated time $\Delta T$ becomes equal to or smaller than a predetermined time (for example one second).

The reference numerals 12Z, 12P and 12N denote stop gap accuracy fuzzy value calculating circuits for calculating fuzzy values of stop gap accuracy when the initially selected notch or brake setting is maintained, when one notch is increased and when one notch is decreased, respectively, 13 denotes a notch-change inhibit circuit for producing a signal M for inhibiting the notch-change for a predetermined time interval, for example, one second after a notch-change has been performed, and 14 denotes a control notch calculating circuit for performing fuzzy reasoning on the basis of the respective outputs of the stop gap accuracy fuzzy value calculating circuits 12Z, 12P and 12N so as to calculate a notch command $N_t$ when the notch-change is not inhibited, and 15 denotes a brake command calculating circuit for interrupting the output of the control notch calculating circuit 14 on the basis of the output of the brake control initiation command circuit 11.

Figure 4:
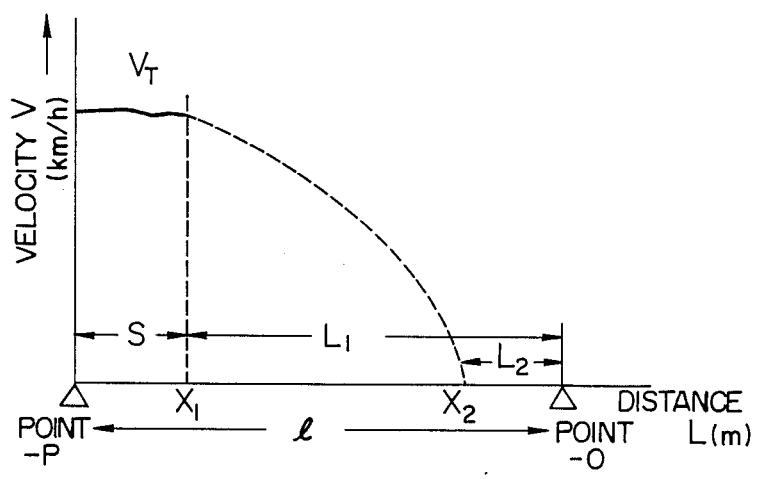
FIG. 4 is a graph for explaining the operation of the device of FIG. 3.
Figure 5:
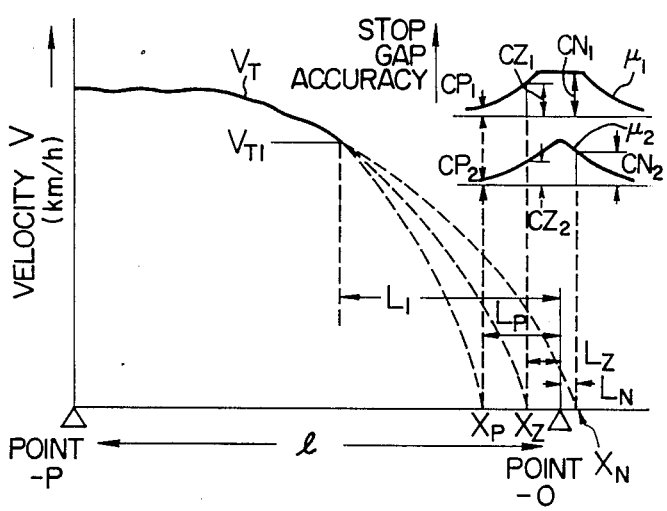
FIG. 5 is another graph for explaining the operation of the device of FIG. 3.

Referring to FIGS. 4 and 5, the operation of this embodiment will be described hereunder.

FIG. 4 is a diagram for explaining the operation to determine the brake control initiation time to control a vehicle to stop at a predetermined position and shows the condition that the vehicle has passed by the point-P placed by a predetermined distance $l$ on this side from the target stop point-O and is at a position $x_1$. The brake control initiation command calculating circuit 11 calculates the time to braking control $\Delta t$ on the basis of a current velocity $V_T$ and the stop gap error $L_2$ obtained by the notch stop gap calculating circuit 10 so as to produce a brake control initiation command when the time to braking control $\Delta t$ becomes equal to or smaller than a predetermined time (for example one second).

FIG. 5 is a diagram for explaining the operation to perform the brake notch selection for stopping a vehicle at a predetermined position. The stop gap accuracy fuzzy value calculating circuits 12Z, 12P and 12N calculate the values $L_Z$, $L_P$ and $L_N$ of stop gap accuracy on the basis of the following equations (4)

$$\begin{aligned} L_Z &= L_1 - V_{T1}^2/(-7.2 \cdot \alpha_{T1}) \\ L_P &= L_1 - V_{T1}^2/\{-7.2(\alpha_{T1} + \Delta\alpha)\} \\ L_N &= L_1 - V_{T1}^2/\{-7.2(\alpha_{T1} - \Delta\alpha)\} \end{aligned} \tag{4}$$

by using the remainder distance $L_1$ to the target point-O obtained by the remainder distance calculating circuit 3', the current velocity $V_{T1}$ obtained by the velocity/acceleration calculating circuit 2', the acceleration $\alpha_{T1}$ and a predetermined acceleration per one notch $\Delta\alpha$ (for example 0.5 Km/h/sec).

Assume now that the stop gap accuracy fuzzy value is composed of the following two support of fuzzy sets:

(1) the value ($\mu_1$) to enable the vehicle to stop within an allowable error; and (2) the value ($\mu_2$) to enable the vehicle to accurately stop at the target position.

The membership function representing the two support of fuzzy sets may be defined by way of example as follows: Assuming that x is a stop gap error (m) and the allowable error is 0.5 m, the membership function $\mu_1(x)$ of the support of fuzzy set to enable the vehicle to stop within an allowable error is defined as $$\begin{aligned} \text{when } x < -0.5 \quad & \mu_1(x) = -0.5/x \\ \text{when } -0.5 \leq x \leq 0.5 \quad & \mu_1(x) = 1.0 \\ \text{when } 0.5 < x \quad & \mu_1(x) = 0.5/x \end{aligned} \tag{5}$$

and the membership function $\mu_2(x)$ of the support of fuzzy set to enable the vehicle to accurately stop at a target position is defined as $$\begin{aligned} \text{when } x < -0.1 \quad & \mu_2(x) = -0.1/x \\ \text{when } -0.1 \leq x \leq 0.1 \quad & \mu_2(x) = 1.0 \\ \text{when } 0.1 < x \quad & \mu_2(x) = 0.1/x \end{aligned} \tag{6}$$

The stop gap accuracy is expressed by the fuzzy values composed of a pair of membership function values $\mu_1(x)$ and $\mu_2(x)$ as mentioned above. That is the stop gap fuzzy values $\dot{C}_Z$, $\dot{C}_P$ and $\dot{C}_N$ when the current notch or brake setting is maintained, when the notch or brake setting is changed to increase by one notch and when the notch or brake setting is changed to decrease by one notch, respectively, are expressed as follows on the basis of the values $L_Z$, $L_P$ and $L_N$:

$$\dot{C}_Z = \{C_{Z1}, C_{Z2}\} = \{\mu_1(L_Z), \mu_2(L_Z)\} \\ \dot{C}_P = \{C_{P1}, C_{P2}\} = \{\mu_1(L_P), \mu_2(L_P)\} \\ \dot{C}_N = \{C_{N1}, C_{N2}\} = \{\mu_1(L_N), \mu_2(L_N)\} \quad (7)$$

The control notch calculating circuit 14 performs the notch selection on the basis of the following fuzzy reasoning (1)–(3) in response to the outputs $\dot{C}_Z$, $\dot{C}_P$ and $\dot{C}_N$ from the stop gap accuracy fuzzy value calculating circuits 12Z, 12P and 12N respectively:

(1) If it is possible to stop the vehicle within tolerance with the current notch, the current notch is maintained;

(2) If it is possible to accurately stop the vehicle at the target position by increasing the notch by one, the notch is changed to increase by one; and (3) If it is possible to accurately stop the vehicle at the target position by decreasing the notch by one, the notch is changed to decrease by one.

The particular notch selection on the basis of the fuzzy reasoning is performed by selecting the maximum values of the membership function ($C_{Z1}$, $C_{P2}$ and $C_{N2}$) corresponding to the above-mentioned fuzzy reasoning (1)–(3). This control is achieved when no notch-change inhibit signal M is produced from the notch-change inhibit circuit 13.

According to this embodiment, since the control to stop a vehicle within an allowable error with respect to a target position is first considered and the notch is changed only when the vehicle may be more accurately stopped by changing the notch to increase/decrease by one, it is possible to realize a method and a device for stopping a vehicle at a predetermined position with accuracy, with less change in notching and with a comfortable ride in the vehicle.

The various calculating circuits 10–15 may be realized easily by combining various kinds of calculating elements or alternatively may be realized by using processing apparatus such as a microcomputer.

Figure 6:
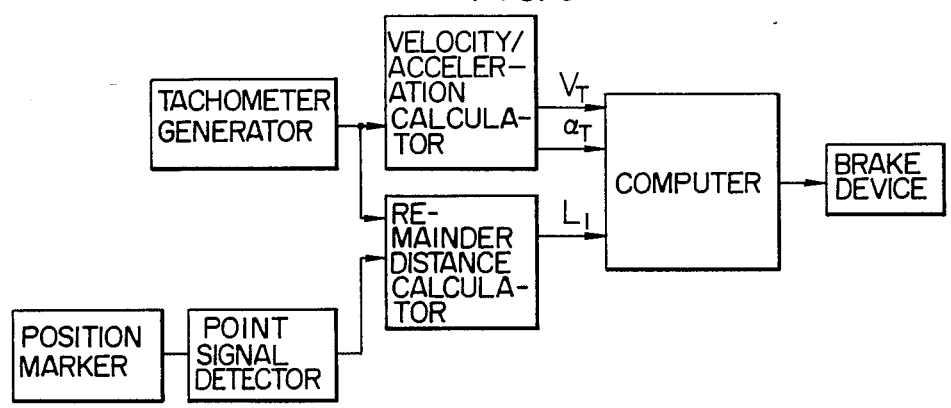
FIG. 6 is a block diagram of another embodiment of the device for stopping a vehicle at a predetermined position according to the present invention.

FIG. 6 shows the configuration of another embodiment of the device for stopping a vehicle at a predetermined position according to the present invention, in which a microcomputer 16 is utilized instead of the calculating circuits 10–15.

Figure 7:
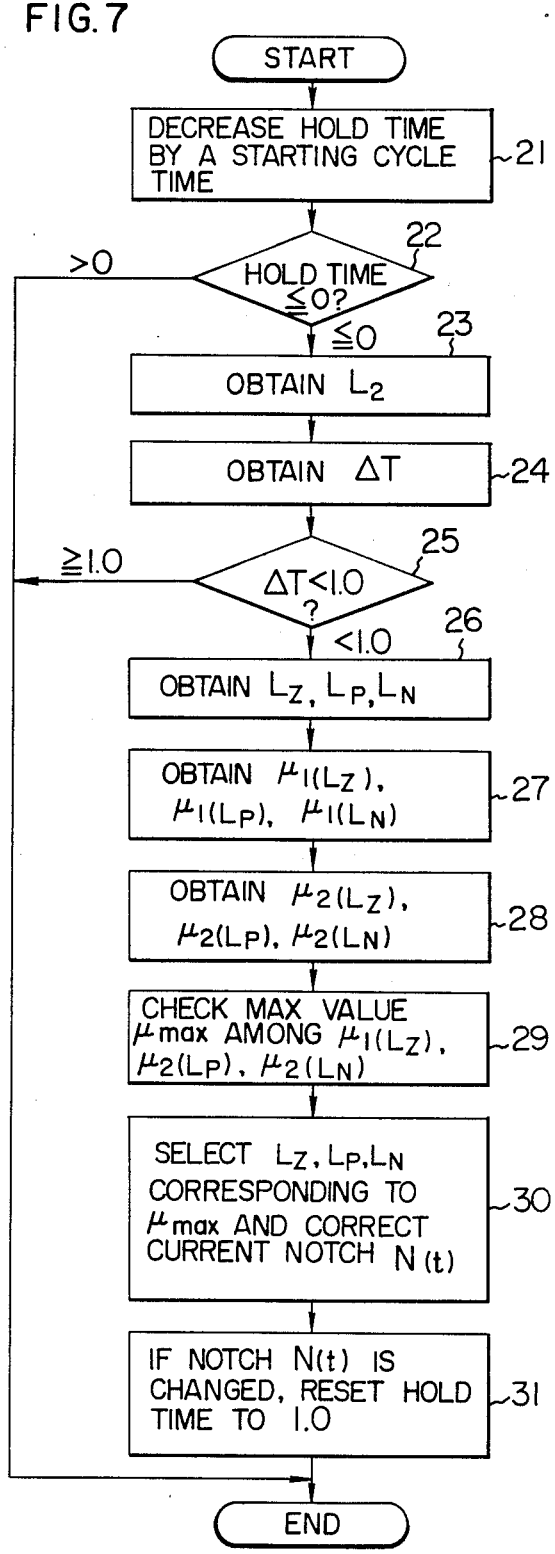
FIG. 7 is a flow-chart for processing in the control section of the device of FIG. 6.

FIG. 7 shows an example of a processing flowchart for the microcomputer 16. The program used in this computer 16 has a function to obtain the notch command N(t) on the basis of the velocity $V_T$ and acceleration $\alpha_T$ of the vehicle and the remainder distance $L_1$ to the target position.

The computer 16 starts the process periodically at a predetermined time of starting cycle, for example, every 100 ms. Initially, a hold time is set at a predetermined value, for example, 1.0 (sec), which corresponds to the time interval during which the output signal of the notch-change inhibit circuit 13 inhibits change of the notch. In the step 21, the hold time is decreased by the time of starting cycle and in the step 22, the decreased hold time is checked as to whether it is larger than zero or not. If the hold time is larger than zero, this cycle of the process ends. Thus, each cycle of the process starts at the starting cycle time of 100 ms after the start of the preceding cycle. When the hold time is decreased not larger than zero, the stop gap error $L_2$ is obtained on the basis of the equation (2) (step 23) and the time $\Delta t$ to braking control is obtained on the basis of the equation (3) (step 24). When the time $\Delta t$ becomes smaller than for example one second (step 25), the values $L_Z$, $L_P$ and $L_N$ of stop gap accuracy are obtained on the basis of the equation (4) (step 26) and the membership functions $\mu_1$ ($L_Z$), $\mu_1(L_P)$, $\mu_1(L_N)$, and $\mu_2(L_Z)$, $\mu_2(L_P)$, and $\mu_2(L_N)$ are obtained on the basis of the equations (5) and (6) respectively (steps 27 and 28). Then checking is made as to which one is the maximum value $\mu_{max}$ among the values $\mu_1(L_Z)$, $\mu_2(L_P)$ and $\mu_2(L_N)$ (step 29) so as to select the control values $L_Z$, $L_P$ and $L_N$ which provide the maximum value $\mu_{max}$ (step 30), thereby correcting the current notch $N_t$ (step 31). If the notch $N_t$ is changed, the hold time is reset to the initial value of 1.0 (step 32).

Figure 8:
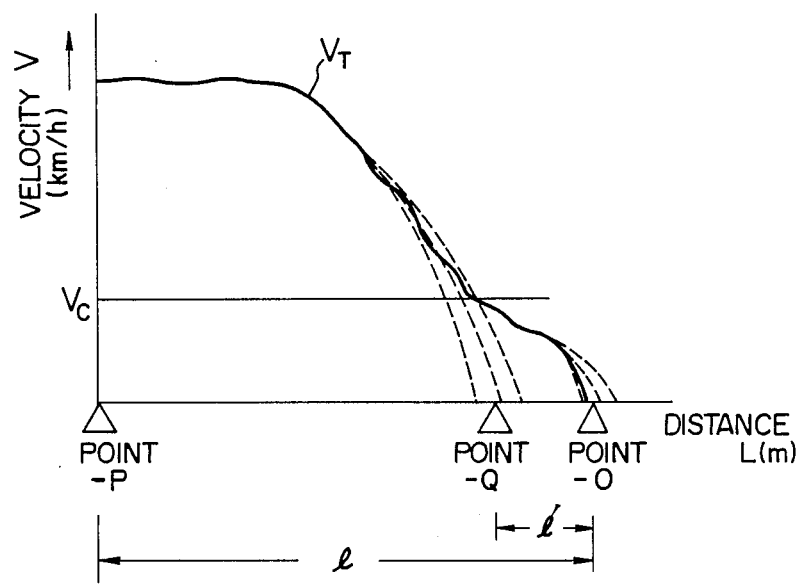
FIG. 8 is a graph illustrating a velocity pattern in a further embodiment of the present invention.

Although the membership functions of the support of fuzzy sets for defining the fuzzy value of stop gap accuracy are defined in accordance with the equations (5) and (6) in the above-mentioned embodiment, the invention is not limited to this definition. For example, as shown in FIG. 8, the target position may be changed step by step in such a manner that when the vehicle velocity is larger than a predetermined value $V_C$ (for example 10 Km/h), a point-Q which is placed by a distance l' (for example 2 m) on this side from the final target point-O is assumed to be a target and when the velocity becomes smaller than the above-mentioned value $V_C$, the point-O is made target.

Further, although the notch is changed to increase/decrease by one in the previous embodiment, it is needless to say that the notch may be changed by more than one notch.

As described above, according to the present invention, a method and a device for stopping a vehicle at a predetermined position in which the distance between actual and target positions of the vehicle and the velocity and acceleration of the vehicle are detected so as to perform brake control by selecting brake control notches on the basis of the detected values of the distance, the velocity and the acceleration to thereby stop the vehicle at the predetermined position, are featured in that the stop gap accuracy in the case where the notch presently on actuation is maintained as well as the stop gap accuracy are obtained as fuzzy values and compared with each other to thereby perform the notch selection, so that the vehicle may be safely stopped within the tolerance of the stop gap accuracy with less change of notching, resulting in a comfortable ride in the vehicle.

What we claim is:

1. A device for stopping a vehicle in an optimum condition when the vehicle is desired to be stopped at a predetermined target position comprising:

first means for detecting a velocity and an acceleration of the vehicle which is in its running state;

second means for determining a distance between a current location of the vehicle and said target position;

third means for estimating, based on the velocity $V_T$ and acceleration $\alpha$ detected by said first means and the distance $L_l$ detected by said second means, a first stop gap accuracy $L=L_l-V_T^2/(k\cdot\alpha_T)$ which would be obtained as a result of control operations under a first command of a brake setting in the vehicle where the brake setting is maintained at its current state and at least one second stop gap accuracy $L'=L_l-V_T^2/k\cdot(\alpha_T\pm\Delta\alpha))$ which would be obtained under a second control command of the brake setting where the brake setting is changed by a predetermined value, and for determining values indicative of a degree of satisfaction of said first and second stop gap accuracies, respectively, with respect to at least one of preselected performances indices relating to the optimum condition in stopping the vehicle wherein k is a constant and Δα represents an estimated variation of acceleration when the brake setting is changed by the predetermined value;

fourth means for selecting one of said first and second control commands by judging said satisfaction degree indicative values according to a predetermined rule; and fifth means for applying to the vehicle said selected one control command of the brake setting.

2. A device according to claim 1, further compromising sixth means for inhibiting said fifth means, when the application of the selected control command of the brake setting involves change of the brake setting, to change the brake setting for a predetermined time interval after a preceding change of the brake setting.

3. A device according to claim 1, wherein said first means includes tachometer generator, and said second means includes a point signal detector for detecting a position marker and means for detecting said distance based on outputs of said tachometer generator and said point signal detector.

4. A method of automatic control in operating a vehicle for obtaining an optimum condition of a given event relating to operation of the vehicle comprising:

a first step of detecting a current value of at least a first parameter representing a running state of the vehicle;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different predetermined control commands, if applied to the running vehicle, respectively;

said different control commands each of which is capable of affecting the value of said second parameter, including at least a first control command maintained at its current state and a second control command changed within a predetermined range from its current state;

a third step of determining a degree of satisfaction of each of said estimated values of the second parameter with respect to at least one of preselected performance indices relating to the optimum condition of said event, said degree of satisfaction being represented by a fuzzy value determined according to a membership function predetermined for each of the performance indices and defining a relationship between the fuzzy value and the value of the second parameter;

a fourth step of selecting one of said different control commands based on the degree of satisfaction of said estimated values of the second parameter; and a fifth step of controlling the vehicle in said selected one control command.

5. A method according to claim 4, wherein said second parameter is a deviation of an actual stop position of the vehicle from a desired target position of the vehicle and said control command is a command for controlling a brake setting of the vehicle.

6. A method according to claim 5, wherein said second, third and fourth steps are repeated by changing stepwise said target stop position depending on the detected value of said first parameter.

7. A method according to claim 4, wherein the first parameter includes at least one of speed, rate of acceleration, distance between an instant position of the vehicle and a target stop position where the vehicle is desired to stop.

8. A method according to claim 4, wherein the degree of satisfaction takes a normalized value of "1" when the degree of satisfaction is maximum and "0" when the degree of satisfaction is minimum.

9. A method according to claim 4, wherein said control command is changed by a predetermined amount from its current state in a direction to increase the value of said second parameter and said different control commands further include a third control command which is changed by a predetermined amount from its current state in a direction to decrease the value of the second parameter.

10. A method according to claim 9, wherein said second, third and fourth steps are repeated by changing stepwise a target value of said second parameter depending on the detected value of said first parameter.

11. A method according to claim 4, wherein the control command applied to the vehicle in the fifth step is maintained for a predetermined time interval.

12. A method according to claim 4, wherein the degree of satisfaction of each of the estimated values of the second parameter is determined, in the third step, with respect to at least one of the performance indices, which constitutes one of selected combinations of the different control commands and the performance indices, and said one control commands is selected, in the fourth step, according to a plurality of rules predetermined according to the optimum condition of said event, respectively, for said selected combinations to define a basic condition of the performance index constituting each of the selected combinations required for selecting the control command of that combination.

13. A device for automatically controlling the operation of a vehicle to obtain an optimum condition of a given event relating to operation of the vehicle comprising:

first means for detecting a current value of at least a first parameter representing a running state of the vehicle;

second means for estimating, based on the detected value of said first parameter, values of a second parameter adapted for evaluating the condition of said event and having a predetermined relationship with the first parameter, said values being those values which would be obtained, respectively, as a result of control operations under a plurality of different control commands if applied to the running vehicle;

said different control commands, each of which is capable of affecting the value of the second parameter, including at least a first control command maintained at its current state and a second control command which is changed within a predetermined range from its current state;

third means for determining a degree of satisfaction of each of said estimated values of the second parameter with respect to at least one of preselected performance indices relating to the optimum condition of said event;

said degree of satisfaction being represented by a fuzzy value determined according to a membership function predetermined for each of the performance indices and defining a relationship between the fuzzy value and the value of the second parameter;

fourth means for selecting one of said different control commands according to the fuzzy values representing the degree of satisfaction of the estimated values of the second parameter; and fifth means for applying to the vehicle the selected one control command, thereby controlling the operation of the vehicle.

14. A device according to claim 13, wherein the second parameter is a distance between a target position where the vehicle is desired to be stopped and an actual position where the vehicle is actually stopped and the control command is a command for determining a brake setting of the vehicle.

15. A device according to claim 14, wherein the first means includes a tachometer generator.

16. A device according to claim 15, wherein the second means includes a point signal detector for detecting a position marker and means for detecting the distance between a current location of the vehicle and the target stop position for the vehicle on the basis of outputs of the tachometer generator and the point signal detector.

17. A device according to claim 13, further comprising sixth means for inhibiting said fifth means from changing the control command for predetermined time interval after a preceding change of the control command.

18. A method of control in moving a movable body for obtaining an optimum condition of a given event relating to moving of the body comprising:

a first step of detecting a current value of at least a first parameter representing a state of the moving body;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different predetermined control commands, if applied to the moving body, respectively;

a third step of determining a degree of satisfaction of each of said estimated values of the second parameter with respect to at least one of preselected performance indices relating to the optimum condition of said event, said degree of satisfaction being represented by a fuzzy value determined according to a membership function predetermined for each of the performance indices and defining a relationship between the fuzzy value and the value of the second parameter;

a fourth step of selecting one of said estimated values of the second parameter according to a rule predetermined according to the optimum condition of said event and selecting one of said different control commands corresponding to said selected one estimated value of the second parameter; and a fifth step of moving the movable body by using said selected one control command.

19. A method according to claim 18, wherein said different control commands include at least a first control command, which affects the value of said second parameter, maintained at its current state.

20. A method according to claim 18, wherein said third step includes selecting one of the estimated values of which the degree of satisfaction is maximum, and selecting one of the different control commands corresponding to said selected one estimated value.

21. A method according to claim 20, wherein said one control command is selected by selecting one of a plurality of rules, each of which is defined by a combination of one of said control commands and one of said performance indices, predetermined according to the optimum condition of said event, respectively, by comparing respective degree of satisfaction of the estimated values of the second parameter determined with respect to the performance index defined in said rules to each other, thereby selecting the control command defined in that selected rule.

22. A method according to claim 18, wherein the membership function defines the relationship between the fuzzy value and a possible value of the second parameter.

23. A method according to claim 18, wherein the fuzzy value takes a normalized value of "1" when the degree of satisfaction is maximum and "0" when the degree of satisfaction is minimum.

24. A method according to claim 18, wherein the first step is carried out periodically at predetermined time intervals.

25. A method according to claim 18, wherein the control command used in the fourth step is maintained at least a predetermined time interval.

26. A method of controlling a controllable subject for obtaining an optimum condition of a given event relating to control of said subject comprising:

a first step of detecting a value of at least a first parameter representing a current state of said controllable state of said subject;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different control commands, if applied to said subject, respectively;

a third step of determining a degree of satisfaction of each of said estimated values of the second parameter with respect to at least one of preselected performance indices relating to the optimum condition of said event, said degree of satisfaction being represented by a fuzzy value determined according to a membership function predetermined for each of the performance indices and defining a relationship between the fuzzy value and the value of the second parameter;

a fourth step of selecting one of said estimated values of the second parameter according to a rule predetermined depending on the optimum condition of said event and selecting one of said different control commands corresponding to said selected one estimated value of the second parameter; and a fifth step of controlling said subject by said selected one control command.

27. A method according to claim 26, wherein said different control commands include at least a first control command which affects the value of said second parameter, maintained at its current state.

28. A method according to claim 26, wherein said fourth step includes selecting one of the estimated values of which the degree of satisfaction is maximum, and selecting one of the different control commands corresponding to said selected one estimated value.

29. A method according to claim 26, wherein said one control command is selected by selecting one of a plurality of rules, each of which is defined by a combination of one of said control commands and one of said performances indices predetermined according to the optimum condition of said event, respectively, by comparing respective degrees of satisfaction of the estimated values of the second parameter determined with respect to the performance index defined in said rules to each other, thereby selecting the control command defined in the selected rule.

30. A method according to claim 26, wherein a plurality of performance indices are provided, and the degree of satisfaction of each of the estimated values of the second parameter for each of the plurality of performance indices is provided.

31. A device for controlling a controllable subject to obtain an optimum condition of a given event relating to control of said subject comprising:
 first means for detecting a value of at least a first parameter representing a current state of said controllable state of said subject;
 second means for estimating, based on said detected value of said first parameter, values of a second parameter adapted for evaluating a condition of said event and having a predetermined relationship with said first parameter, said values being those values which would be obtained, respectively, as a result of control operations under a plurality of different control commands, if applied to said subject, respectively;
 third means for determining a degree of satisfaction of each of said estimated values of the second parameter with respect to at least one of preselected performance indices relating to the optimum condition of said event, said degree of satisfaction being represented by a fuzzy value determined according to a membership function predetermined for each of the performance indices and defining a relationship between the fuzzy value and the value of the second parameter;
 fourth means for selecting one of said estimated values of the second parameter according to a rule predetermined depending on the optimum condition of said event and selecting one of said different control commands corresponding to said selected one estimated value of the second parameter; and
 fifth means for controlling said selected one control command to said subject for control therewith.

32. A device according to claim 31, wherein said different control commands include at least a first control command which affects the value of said second parameter, and is maintained at its current state.

33. A device according to claim 31, wherein said fourth means includes means for selecting one of the estimated values of which the degree of satisfaction is maximum, thereby to select one of the different control commands corresponding to said selected one estimated value.

34. A device according to claim 31, wherein said third means determines the fuzzy value for the estimated values of the second parameter with respect to a plurality of the performance indices, and said fourth means selects said one control command by selecting one of a plurality of rules, each of which is defined by a combination of one of said control commands and at least one of said performance indices predetermined according to the optimum condition of said event, respectively, by comparing respective fuzzy values of the second parameter determined with respect to the performance index defined in said rules to each other, thereby to select the control command defined in that selected rule.

35. A device according to claim 31, further comprising means for maintaining the control command applied to said subject at least a predetermined time interval.

36. A method for controlling a controllable subject for obtaining an optimum condition of a given event relating to control of said subject comprising:
 a first step of detecting a value of at least a first parameter representing a current state of said subject;
 a second step of generating, based on said detected value of said first parameter, values of a second parameter adapted for evaluating a condition of said event and having a predetermined relationship with said first parameter, said values being those values which would be obtained, respectively, as a result of control operations under a plurality of different control commands, if applied to said subject, respectively;
 a third step of converting each of said values of the second parameter to at least one fuzzy value determined according to at least one of membership functions with respect to preselected performance indices relating to the optimum condition of said event, each of said membership functions defining a relationship between the fuzzy value and the value of the second parameter;
 a fourth step of selecting one of said different control commands based on the fuzzy values of the second parameter; and
 a fifth step of producing a control signal corresponding to said selected control command.

37. A method according to claim 36, wherein said different control commands include at least a first control command which affects the value of said second parameter and is maintained at its current state.

38. A method according to claim 36, wherein said one control command is selected by selecting one of plurality of predetermined rules, each of which comprises a first part designating one of said performance indices and a second part designating the control command to be selected, on the basis of the fuzzy values with respect to the performance indices defined in the first part of said respective rules, thereby selecting the control command defined in the selected rule.

39. A method of automatic control in operating a vehicle for obtaining an optimum condition of a given event relating to operation of the vehicle comprising:
 a first step of detecting a current value of at least a first parameter representing a running state of the vehicle;
 a second step of estimating, based on the detected value of said first parameter, values of a second parameter adapted for evaluating a condition of said event and having a predetermined relationship with said first parameter, said values being those values which would be obtained, respectively, as a result of control operations under a plurality of different predetermined control commands, if applied to the running vehicle, respectively;

said different control commands each of which is capable of affecting the value of said second parameter, including at least a first control command maintained at its current state and a second control command changed within a predetermined range from its current state;

a third step of determining a degree of satisfaction of each of said estimated values of the second parameter with respect to at least one of preselected performance indices relating to the optimum condition of said events, a fourth step of selecting one of said different control commands based on the degree of satisfaction of said estimated values of the second parameter; and a fifth step of controlling the vehicle in said selected one control command, wherein the degree of satisfaction is generally represented by a fuzzy value determined according to a predetermined membership function defining a relationship between the fuzzy value and the value of the second parameter and takes a normalized value of "1" when the degree of satisfaction is minimum.

40. A method of control in moving a movable body for obtaining an optimum condition of a given event relating to moving of the body comprising:

a first step of detecting a current value of at least a first parameter representing a state of the moving body;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different predetermined control commands, if applied to the moving body, respectively;

a third step of selecting one of said estimated values of the second parameter according to a rule predetermined according to the optimum condition of said event and selecting one of said different control commands corresponding to said selected one estimated value of the second parameter; and a fourth step of moving the movable body by using said selected one control command, wherein said third step includes determining a degree of satisfaction of each of the estimated values of the second parameter with respect to at least one of preselected performance indices relating to the optimum condition of said event, selecting one of the estimated values of which the degree of satisfaction is maximum, and selecting one of the different control commands corresponding to said selected one estimated value; and wherein the degree of satisfaction of each of the estimated values of the second parameter is represented by a fuzzy value determined according to a membership function predetermined for each performance index and defining a relationship between the fuzzy value and a possible value of the second parameter.

41. A method of control in moving a movable body for obtaining an optimum condition of a given event relating to moving of the body comprising:

a first step of detecting a current value of at least a first parameter representing a state of the moving body;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different predetermined control commands, if applied to the body, respectively;

a third step of selecting one of said estimated values of the second parameter according to a rule predetermined according to the optimum condition of said event and selecting one of said different control commands corresponding to said selected one estimated value of the second parameter; and a fourth step of moving the movable body by using said selected one control command, wherein said third step includes determining a degree of satisfaction of each of the estimated values of the second parameter with respect to at least one of preselected performance indices relating to the optimum condition of said event, selecting one of the estimated values of which the degree of satisfaction is maximum, and selecting one of the different control commands corresponding to said selected one estimated value, wherein the degree of satisfaction of each of the estimated values of the second parameter is determined with respect to a plurality of the performance indices, and said one control command is selected according to a plurality of rules, each of which is defined by a combination of one of said control commands and one of said performance indices, predetermined according to the optimum condition of said event, respectively, by comparing a respective degree of satisfaction of the estimated values of the second parameter determined with respect to the performance index defined in said rules to each other, thereby for each of the combinations selecting the control command defined in that rule, and wherein the degree of satisfaction of each of the estimated values of the second parameter is represented by a fuzzy value determined according to a membership function predetermined for each of the performance indices and defining a relationship between the fuzzy value and a possible value of the second parameter.

42. A method of controlling a controllable subject for obtaining an optimum condition of a given event relating to control of said subject comprising:

a first step of detecting a value of at least a first parameter representing a current state of said controllable state of said subject;

a second step of estimating, based on the detected value of said first parameter, values of a second parameter adapted for evaluating a condition of said event and having a predetermined relationship with said first parameter, said values being those values which would be obtained, respectively, as a result of control operations under a plurality of different control commands, if applied to said subject, respectively;

a third step of selecting one of said estimated values of the second parameter according to a rule predetermined depending on the optimum condition of said event and selecting one of said different control commands corresponding to said selected one estimated value of the second parameter; and a fourth step of controlling said subject by said selected one control command, wherein said third step includes determining a degree of satisfaction of each of the estimated values of the second parameter with respect to at least one of preselected performance indices relating to the optimum condition of said event, selecting one of the estimated values of which the degree of satisfaction is maximum, and selecting one of the different control commands corresponding to said selected one estimated value, and wherein the degree of satisfaction of each of the estimated values of the second parameter is represented by a fuzzy value determined according to a membership function predetermined for each of the performance indices and defining a relationship between the fuzzy value and a possible value of the second parameter.

* * * * *